(12) United States Patent
Rao

(10) Patent No.: US 8,335,615 B2
(45) Date of Patent: Dec. 18, 2012

(54) WHIPLASH REDUCTION SYSTEM

(75) Inventor: Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1110 days.

(21) Appl. No.: 12/138,667

(22) Filed: Jun. 13, 2008

(65) Prior Publication Data

US 2009/0312916 A1 Dec. 17, 2009

(51) Int. Cl.
*B60R 21/01* (2006.01)

(52) U.S. Cl. .......................................... 701/45; 280/735

(58) Field of Classification Search ..................... 701/45, 701/47; 280/735, 753; 180/282, 271
See application file for complete search history.

(56) References Cited

U.S. PATENT DOCUMENTS

| | | | |
|---|---|---|---|
| 3,898,652 A * | 8/1975 | Rashid | 342/59 |
| 5,788,281 A * | 8/1998 | Yanagi et al. | 280/806 |
| 6,151,539 A * | 11/2000 | Bergholz et al. | 701/25 |
| 6,331,014 B1 * | 12/2001 | Breed | 280/730.1 |
| 6,746,078 B2 * | 6/2004 | Breed | 297/216.12 |
| 7,070,205 B2 * | 7/2006 | Becker et al. | 280/751 |
| 2005/0004719 A1 | 1/2005 | Dickmann et al. | |
| 2005/0062953 A1 | 3/2005 | Beuschel | |
| 2006/0282202 A1 | 12/2006 | Cashler et al. | |
| 2007/0032952 A1* | 2/2007 | Carlstedt et al. | 701/301 |

OTHER PUBLICATIONS

"Continental Automotive Systems," <http://www.conti-online.com/generator/www/us/en/continentalteves/continentalteves/themes/products/electronic_brake_and_safety_systems/occupant_safety_systems/pre_crash_sensing_en.html>.

"TEMIC: The Intelligent Car for Maximum Safety," <http://www.conti-online.com/generator/www/jp/jp/continentalteves/continentalteves/themes/press_services/press_archive/press_archive_2001/pr_2001_09_07_2_jp.html>.

* cited by examiner

*Primary Examiner* — Paul N Dickson
*Assistant Examiner* — Timothy Wilhelm
(74) *Attorney, Agent, or Firm* — Franklin MacKenzie; Ford Global Technologies, LLC

(57) ABSTRACT

A low cost whiplash reduction system for a host vehicle, said host vehicle including a sensor arrangement operable to detect closing velocities of one or more rearwardly approaching objects substantially in a direction of travel of the host vehicle, and a processing arrangement for receiving information from the sensor arrangement indicative of said detected closing velocities, said processing arrangement being operable to actuate adaptive safety features in response to detected velocities of detected rearwardly approaching objects to the host vehicle to automatically selectively apply said adaptive safety features in response to said information received from the sensor arrangement for avoiding or mitigating host vehicle occupant neck whiplash injury occasioned by a crash of the rearwardly approaching object and the host vehicle.

21 Claims, 4 Drawing Sheets

WHIPLASH REDUCTION SYSTEM

TECHNICAL FIELD OF THE INVENTION

The present invention relates to a low cost whiplash reduction system for road vehicles, for example personal automobiles as well as freight vehicles. Moreover, the present invention also concerns sensor configurations adapted for incorporation into such road vehicles for implementing such low cost whiplash reduction systems. Furthermore, the present invention relates to methods of operating such low cost whiplash reduction systems.

BACKGROUND OF THE INVENTION

In many traffic scenarios encountered in urban locations, for example in city traffic, distances between moving and stationary objects in the rear of a vehicle are often relatively short, for example a few meters. Drivers of vehicles in such scenarios are confronted with complex situations in which the drivers are susceptible to being momentarily distracted. A momentary distraction can, for example, result in one or more collisions when traveling in a forward direction or while being stationary in a traffic situation. Such collisions may cause vehicle occupants to suffer "whiplash" type injuries. The term "whiplash injury" is understood to mean an injury sustained by the sudden acceleration or deceleration of a vehicle occupant during a collision event. The rapid, unanticipated movement of the occupant during such a collision event may cause severe soft or hard tissue injury to an occupant's neck and/or back resulting in the condition commonly known as whiplash.

As stated in NHTSA DOT HS 809 540 report dated March 2003 by Satokh Singh, PhD entitled "Driver Attributes and Rear End Crash Involvement Propensity", rear end crash refers to a crash in which the front of one vehicle collides with the rear of another vehicle. Thus, a driver in such a crash may be the driver of a striking vehicle, a struck vehicle or of the vehicle that is both striking and was struck. Rear end crashes are not only one of the most frequently occurring types of crashes, but also are responsible for a large number of injuries and fatalities and substantial property damage every year. In fact, based upon the General Estimates System (GES) of the National Automotive Sampling System (NASS) and the Fatality Analysis Reporting System (FARS) data, complied by the National Highway Transportation Safety Agency (NHTSA), approximately 29.7% of all crashes in the year 2000 were rear-end crashes. These crashes were responsible for 30% of all injuries and 29.7% of the property damage. So far as the involvement of drivers in rear-end crashes is concerned, of the 190,625,000 licensed drivers (Federal Highway Administration (FHWA)) in 2000, approximately 2.2% were involved in rear-end crashes. Further, of the 6% of the licensed drivers involved in all types of crashes, 36% were involved in rear end crashes alone.

This significant involvement of drivers in rear end crashes alone is a matter of great concern. It is becoming increasingly apparent that in order to develop effective rear end crash countermeasures, a better understanding of the driving behavior and performance associated with response to driving conflict or imminent crash situations is needed. In addition, improved safety countermeasures during a pre-crash phase are especially needed to protect occupants from injuries.

NHTSA has funded extensive research on rear end collision warning and control. Radar, lidar, ultrasonic and vision based systems installed on the front of impacting or bullet vehicles have some effect on reducing front to rear end crashes between vehicles. Some lidar and radar systems installed at the back of a vehicle being impacted to predict unavoidable collisions and activate appropriate countermeasures to reduce vehicle occupant injuries such as neck whiplash are also known in the literature.

There is thus a requirement for increased vehicular collision management, especially in city and urban situations, and most especially for rear end collision to provide a low cost whiplash reduction system for occupants in vehicles that are struck from the rear.

SUMMARY OF THE INVENTION

An object of the invention is to provide an improved low cost whiplash reduction system for road vehicles. According to a first aspect of the present invention, there is provided a low cost whiplash reduction system for a vehicle, said low cost whiplash reduction system including a sensor arrangement operable to detect closing velocities of one or more rearwardly positioned and/or approaching objects substantially and a processing arrangement for receiving information from the sensor arrangement indicative of said rearwardly approaching detected closing velocities, said processing arrangement being operable to automatically selectively apply operating features including adaptive safety features of the vehicle in response to said information received from the sensor arrangement for avoiding or mitigating injuries, such as neck whiplash, to an occupant during a crash of the vehicle with said one or more rearwardly approaching objects.

An advantage of the present invention is that the low cost whiplash reduction system is effective regardless of the vehicle speed incident to any potential rearward crashes.

Preferably, in the low cost whiplash reduction system, the low cost whiplash reduction system is active regardless of whether the vehicle traveling speeds, and may also be active when the vehicle is stationary such as if at a traffic stop.

Preferably, in the low cost whiplash reduction system, the processing arrangement is operable to cause the one or more adaptive safety features to selectively engage during the approach and imminent impact or crash of a rearwardly approaching object to a vehicle.

Preferably, in the low cost whiplash reduction system, the sensor arrangement includes a closing velocity sensor operable to employ one or more infrared laser sensors for sensing the one or more rearwardly approaching objects. More preferably, said one or more infrared laser sensors are operable to employ pulse-echo and/or Doppler optical frequency shift analysis to detect said one or more rearwardly approaching objects.

Preferably, in the low cost whiplash reduction system, said sensor arrangement is operable to sense said one or more rearwardly approaching objects at a distance in a range of 4 to 10 meters from the vehicle. More preferably, said sensor arrangement is operable to sense said one or more rearwardly approaching objects at a distance in a range of 6 to 8 meters from the vehicle. Such a sensing range is a practical compromise between being able to sense one or more objects which are susceptible to being a crash risk but without collecting so much information that data processing becomes intractable.

Preferably, in the low cost whiplash reduction system, the sensor arrangement is adapted to be mounted behind a rearward rear view windscreen of the vehicle through which a driver of the vehicle observes a region in the rear of the vehicle, the sensor arrangement being operable to sense the one or more rearwardly approaching objects via the rearward rear view windscreen. Such spatial location of the sensor arrangement within the vehicle is of benefit in that the sensor arrangement is physically protected from damage, and that measures taken by the driver of the vehicle to maintain a rearward rear view windscreen of the vehicle clean for ensuring a satisfactory field of view also provides the sensor arrangement with a clear field of view. More preferably, the sensor arrangement is adapted to be mounted towards an upper region of the rearward rear view windscreen.

Preferably, in the low cost whiplash reduction system, the sensor arrangement is included in a rearward rear view windscreen electronic module (RWEM). More preferably, the rearward rear view windscreen electronic module is integral as a unit with the rear view windscreen. Including the sensor arrangement within a rear view windscreen electronic module results in less component assemblies to be handled during initial assembly of the vehicle, thereby potentially decreasing its cost of manufacturing and easing subsequent routine maintenance of the vehicle.

Preferably, in the low cost whiplash reduction system, the rear view windscreen electronic module (RWEM) includes other sensors in addition to the sensor arrangement. Beneficially, the rear view windscreen electronic module includes other types of sensors so as to enhance functionality provided from the module to the vehicle whilst not further complicating manufacture of the vehicle.

Preferably, in the low cost whiplash reduction system, the processing arrangement and the one or more whiplash reduction countermeasures are coupled in mutual communication via one or more data communication networks of the vehicle. More preferably, the one or more communication networks are implemented as one or more of: HS_CAN, MS_CAN, CAN, LIN. Yet more preferably, the processing arrangement and the one or more whiplash reduction countermeasures are mutually coupled by plurality of parallel communication network paths for improving whiplash reduction countermeasures reliability for mitigating or avoiding whiplash injuries due to impact with said one or more rearwardly approaching objects.

Preferably, the low cost whiplash reduction system is operable to deploy operational measures including at least one of: an audio warning, a visual warning, a haptic warning, active seat headrest activation, adaptive seatbelt adjustment, and air bag activation. More preferably, the processing arrangement is operable to activate the audio warning and/or the visual warning prior to said whiplash reduction countermeasure activation. More preferably, said adaptive seatbelt adjustment is operable to tension one or more seatbelts of the vehicle in combination with said active seat headrest activation.

Preferably, in the low cost whiplash reduction system, the sensor arrangement is also operable to sense precipitation external to the vehicle, and the processing arrangement is operable to modify the threshold speed and/or the deceleration of the vehicle in response to the sensed precipitation external to the vehicle. Such dynamic adjustment of the threshold speed and/or the deceleration of the vehicle is capable of enhancing vehicle control under adverse weather conditions.

According to a second aspect of the present invention, there is provided a vehicle including a low cost whiplash reduction system according to the first aspect of the invention, the system being operable to provide in operation automatic activation of at least one adaptive safety feature of said vehicle for mitigation or avoidance of occupant injury during a rearward crash incident.

According to a third aspect of the present invention, there is provided a rear view windscreen electronic module (RWEM) including a closing velocity sensor arrangement for implementing a low cost whiplash reduction system according to the first aspect of the invention, said closing velocity sensor arrangement including one or more infrared lasers for generating laser beams for detecting in operation closing velocities of one or more rearwardly approaching objects.

According to a fourth aspect of the present invention, there is provided a method of reducing occupant whiplash in a vehicle during a rearward crash or collision event, said vehicle including a low cost whiplash reduction system including a sensor arrangement coupled in communication with a processing arrangement and one or more adaptive safety features of the vehicle, said method including steps of:

(a) employing the sensor arrangement to detect closing velocities of one or more rearwardly approaching objects to a vehicle;

(b) receiving information at the processing arrangement from the sensor arrangement describing said closing velocities of said one or more rearwardly approaching objects, and assessing from said information whether or not a crash between said one or more rearwardly approaching objects and the vehicle is likely, and (c) automatically applying said one or more adaptive safety features of the vehicle when a risk of a rear end crash is determined by the processing arrangement to be likely.

Preferably, in the method, the processing arrangement is operable to activate the adaptive safety features of the vehicle regardless of its velocity.

Preferably, the method includes a step of arranging for the sensor arrangement to generate a plurality of infrared beams of optical radiation for sensing said one or more rearwardly approaching objects. More preferably, the method includes a further step of directing the infrared beams of optical radiation through a rear view windscreen of said vehicle for sensing said one or more rearwardly approaching objects.

It will be appreciated that features of the invention are susceptible to being combined in any combination without departing from the scope of the invention as defined by the appended claims.

DETAILED DESCRIPTION OF PREFERRED EMBODIMENTS

Figure 1:
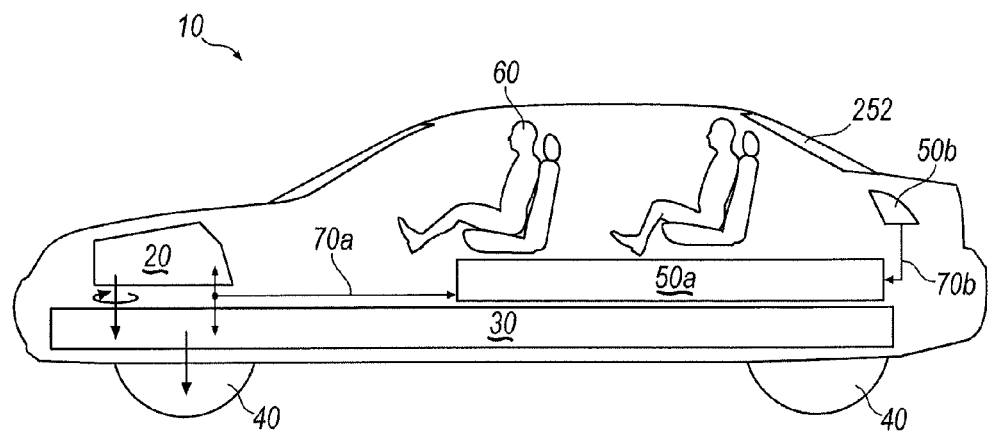
FIG. 1 is a schematic illustration of a vehicle in side view, the vehicle including therein a data communication network with a closing velocity sensor for implementing a low cost whiplash reduction system pursuant to the present invention.

Embodiments of the invention described below are operable to provide low cost whiplash reduction, for example by automatic activation of at least one adaptive safety feature, in situations in which a driver of a moving or a stationary vehicle is confronted with a collision with another moving vehicle or object in the rear of the vehicle. Preferably, other operating features are additionally deployed in conjunction with the adaptive safety features being invoked. For example, the headrest of the vehicle seat is thrust by servos adaptive to input from the RWEM upwards and forwardly toward an occupant of the vehicle to reduce a risk of a neck whiplash injury of an occupant of the vehicle in crash injury mitigation situations. Dynamic Seatbelts of the vehicle are tightened to better restrain the vehicle occupants in crash injury mitigation situations. An audio warning is provided to an occupant or driver of a vehicle, for example a bleeping sound is generated prior to one or more adaptive safety features of the vehicle being automatically applied in crash injury mitigation situations. A visual warning may be provided to a driver or occupant of a vehicle. For example, a flashing warning light is activated, prior to adaptive safety features of the vehicle being automatically applied in crash injury mitigation situations. A haptic warning may further be provided such as a vibration in the steering wheel or seat to alert an occupant of an imminent rear end collision.

The embodiments each employ a closing velocity (CV) sensor for collecting pre-crash data and thereby enabling an algorithm implemented in processing hardware of the embodiments to compute a closing velocity of a rearwardly approaching object, such as a bullet vehicle, for determining whether or not automatic, namely autonomous, adaptive safety features should be applied. Such adaptive safety features are, for example, of benefit in mitigating relatively rear end collisions and thereby potentially providing occupant protection, for example whiplash protection, and so forth. The closing velocity (CV) sensor algorithm is beneficially implemented in combination with a supplementary restraints system (SRS) included in the embodiments. The embodiments of the invention are configured to deploy supplementary restraints in an event of a potential crash; such supplementary restraints include, for example, seatbelts and airbags.

In embodiments of the invention described below, closing velocity sensors incorporated therein are implemented using multiple-channel laser sensors. Preferably, each sensor has three channels. Moreover, one or more lasers utilized in each of the sensors are preferably infrared (IR) lasers. Furthermore, the lasers sensors preferably have a detection range from 4 to 10 meters, more preferably from 6 to 8 meters. As will be elucidated in greater detail later, the laser sensors are beneficially implemented in rear view windscreen electronic modules (RWEM), thereby potentially benefiting from physical protection by way of such rear view windscreens as well as being provided a potentially clear field of view as desired by drivers for their rear view windscreens. Moreover, integration of the laser sensors with rear view windscreens means that vehicle assembly is not unduly made more complicated by additional components being needed to be handled during such vehicle assembly.

Referring to FIG. 1, there is shown a host vehicle indicated generally by 10 including a low cost whiplash reduction system according to the present invention. The vehicle 10 comprises an engine 20 for providing motive power, the engine 20 being coupled via a transmission arrangement 30 to one or more wheels 40 of the vehicle 10. Moreover, the vehicle 10 includes a configuration of sub-systems denoted generally by 50a, 50b coupled to associated data networks 70a, 70b for assisting a driver 60 of the vehicle 10 to operate the vehicle 10.

Figure 2:
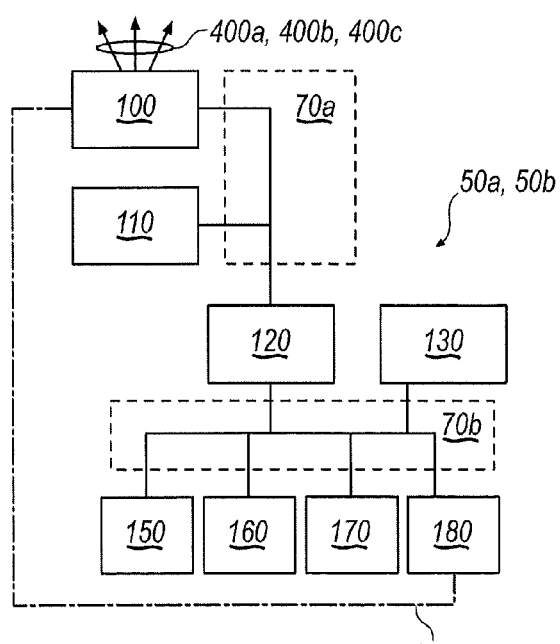
FIG. 2 is a schematic illustration of the communication network of the vehicle illustrated in FIG. 1, the network including the closing velocity sensor for implementing an automatic whiplash reduction system.

The configuration of sub-systems 50a, 50b is illustrated schematically in greater detail in FIG. 2. The data networks 70a, 70b are optionally implemented to conform to conventional standards, for example in conformity with the HS_CAN or MS_CAN standard devised by Koninklijke Philips Electronics N.V. The HS-CAN standard was originally developed for engine management networks but is increasingly being adopted by vehicle manufacturers for passenger safety and comfort functions as well as providing a backbone for diverse vehicle functions.

Referring now to FIG. 2, the aforesaid configuration of sub-systems 50a, 50b comprises a closing velocity (CV) sensor 100 and a driver information module (DIM) 110; the closing velocity (CV) sensor 100 is based on aforementioned IR-laser components. The closing velocity (CV) sensor 100 and the module DIM 110 are coupled via the MS_CAN network 70a to a central electronic module (CEM) 120 also forming a part of the configuration of sub-systems 50a, 50b. The central electronic module 120 is, in turn, coupled to the HS_CAN network 70b. The HS_CAN network 70b is also coupled to a steering angle sensor (SAS) 130, to a brake control module (BCM) 150, to a transmission control module (TCM) 160, to an engine control module (ECM) 170, and to a supplementary restraints system (SRS) 180. The sensors 100, 130, the control modules 150, 160, 170, and the restraints system 180 are also included in the aforementioned configuration of sub-systems 50a, 50b. Optionally, a dedicated additional communication network denoted by 190, for example implemented as a CAN or LIN network, is included for enabling the closing velocity sensor 100 and the supplementary restraints system 180 to directly mutually communicate. This optional additional communication network 190 is capable of providing enhanced reliability of communication between the closing velocity sensor 100 and the supplementary restraints system 180. The supplementary restraints system 180 includes a range of operative features such as airbags, seat belts, seat belt pretensioners, vehicle seat headrests, and other structures operable to reduce injury to the driver 60 and other occupants in the vehicle 10 in an event of a potential crash of the vehicle 10.

In a scenario wherein an impact of the an object, such as a bullet vehicle, with the host vehicle 10 is likely, the sensor 100 autonomously sends warning messages via the data network 70b to the adaptive safety features and may further provide the driver 60 with at least one of an audio warning and a visual warning indicative that the vehicle 10 will be thereafter subject to rearward collision. Alternatively, or additionally, the closing velocity (CV) sensor 100 communicates directly via one or more of the additional communication networks 190 to the adaptive safety features 180, for example, the messages sent from the closing velocity (CV) sensor 100 can also trigger deployment of other restraints, for example airbags or similar energy absorbing structures and may, for example, cause seatbelt tensioning in preparation for a potential rear end crash. Such seatbelt tensioning is effective at potentially reducing occupant neck whiplash injuries in a rear end crash situation. Moreover, the head rests may be moved upwardly and toward an occupant's head level to further reduce any whiplash injuries during a rear end collision.

In an event of the data networks 70a, 70b becoming overloaded with data flow or malfunctioning at a critical moment, the additional network 190 is capable of providing one or more additional communications paths, for example by way of redundancy, thereby enhancing communication reliability so that injury mitigation countermeasures are more reliably provided in operation in crash situations.

The range of the closing velocity sensor 100, as elucidated in the foregoing, is, for example, only 6 to 8 meters which corresponds to circa 1.5 seconds travel at 20 km/h. On account of such range limitation, it will be appreciated that crash injury mitigation is achievable in the relative speed range of 12 km/h to 20 km/h.

However, providing the closing velocity sensor 100 with a range of more than 6 to 8 meters potentially results in significantly more data being collected by the sensor 100, thereby potentially resulting in a risk of spurious reflections of beams emitted from the sensor 100 from objects which are not hazardous to the vehicle 10. Conversely, a smaller range than 6 to 8 meters renders the low cost whiplash reduction system potentially less effective in operation at providing crash injury mitigation for the vehicle 10 occupants. Thus, the range of 6 to 8 meters is found to be especially suitable in practice.

Figure 3:
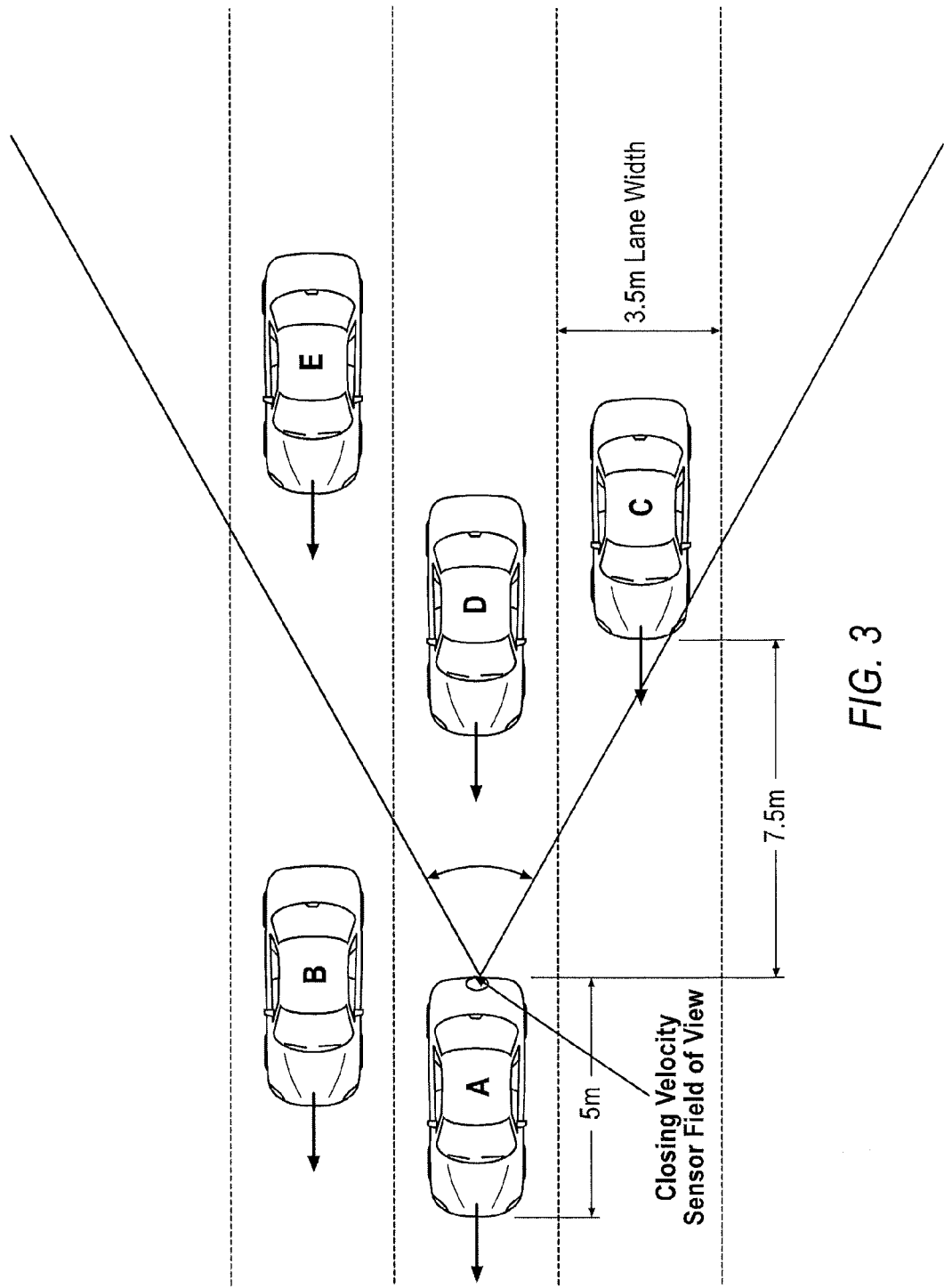
FIG. 3 is a schematic representation of the closing velocity sensor mounted on a vehicle in traffic.
Figure 4:
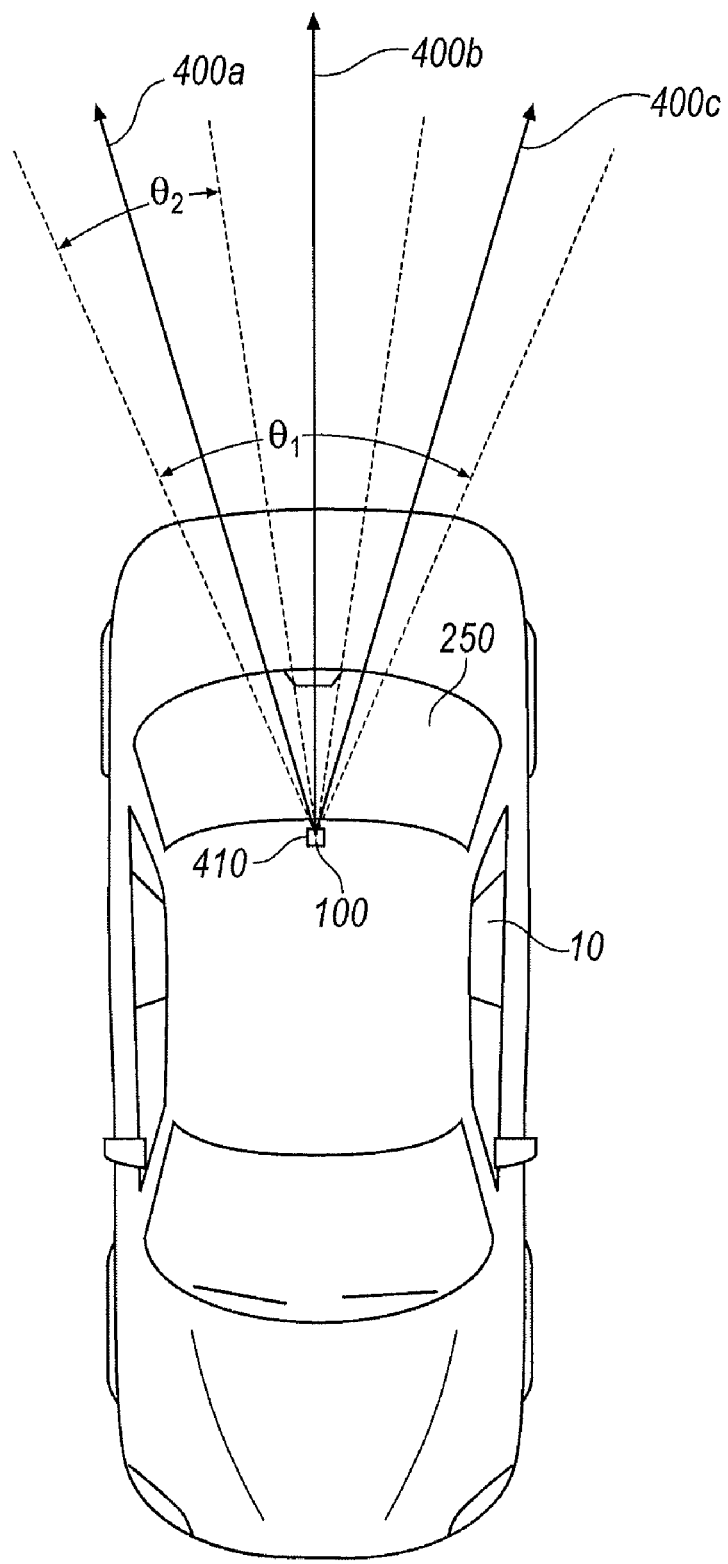
FIG. 4 is a schematic top-view illustration of a mounting arrangement for the closing velocity sensor, the mounting arrangement concerning inclusion of the closing velocity sensor within a rear view windscreen electronic module (RWEM) and environmentally protected by a rear view windscreen of the vehicle in FIG. 1.

As seen in FIGS. 3 and 4, the closing velocity (CV) sensor 100 is optionally mounted at a position in the vehicle 10 whereat it is able to most optimally sense rearwardly approaching objects in rear of the vehicle 10 and yet be robust to contamination, dirt, condensation, solar radiation and potential damage from stones and other small objects encountered in road environments. Moreover, the closing velocity (CV) sensor 100 is optionally included in the host vehicle 10 in a position most suitable for simplifying manufacture. The closing velocity (CV) sensor 100 is most beneficially included in the vehicle as a rear view windscreen electronic module (RWEM) 410. A rear view windscreen 250 of the host vehicle 10 is therefore optionally arranged to exhibit sufficient infrared transmission at a radiation wavelength of 905 nm substantially at which the closing velocity sensor 100 operates. In this respect, it is desirable that the closing velocity sensor 100 be included behind the rear view windscreen 250 so that the rear view windscreen 250 provides mechanical and weather protection for the sensor 100 and the environment within the vehicle 10 avoids problems with condensation; such an arrangement is illustrated schematically in FIG. 5 whereat the electronic module (RWEM) 410 is mounted towards an upper region of the rear view windscreen 250.

Alternatively, or additionally the closing velocity (CV) sensor 100 can also be included in combination with one or more rear light units of the host vehicle 10, for example protected by their lens covers; the lens covers are beneficially operable to be transmissive to radiation having a wavelength corresponding to that of the three beams of infrared radiation generated by the closing velocity sensor 100 when in operation. Note that vehicle A in FIG. 3 has the closing velocity sensor mounted in a rearward facing portion and the sensor can sense the speeds of approaching bullet vehicles C, D, and E at a range of about 7.5M. Those bullet vehicles within the range of the closing velocity sensor are considered as potential impactor candidates by the ECU.

In FIG. 4, an example of spatial positioning of the closing velocity (CV) sensor 100 within the vehicle 10 is illustrated. The closing velocity (CV) sensor 100 is located optionally behind the rear view windscreen 250 at an upper region thereof, although other positions can be adopted if required. For example, the CV sensor can be located as depicted within the vehicle compartment. However, more optionally, the closing velocity (CV) sensor 100 is included as part of a rear view windscreen electronic module (RWEM) 410. Conveniently, the RWEM 410 can also include other sensors, for example optical sensors for monitoring headlights of bullet vehicles rearwardly approaching the host vehicle 10. In addition, the closing velocity (CV) sensor 100 is itself synergistically additionally capable of functioning as a precipitation sensor, for example as a rain sensor, and as an ambient light sensor. Optionally, other vehicle systems can be modified in response to a precipitation condition detected by the closing velocity (CV) sensor 100, for example to enhance activation of the adaptive braking and safety features of the vehicle 10 in wet or icy conditions.

The rear view windscreen 250 is, as described earlier, fabricated from a material which allows three pulsed beams of infrared radiation 400a, 400b, 400c to propagate through the rear view windscreen 250 and be subsequently reflected from rearwardly approaching objects at the rear of the vehicle 10 to generate corresponding reflected radiation which is received back at the closing velocity (CV) sensor 100. By one or more of pulse-echo signal detection techniques and optical Doppler shift techniques, closing velocities of the rearwardly approaching objects can be computed at the closing velocity sensor 100.

Figure 5:
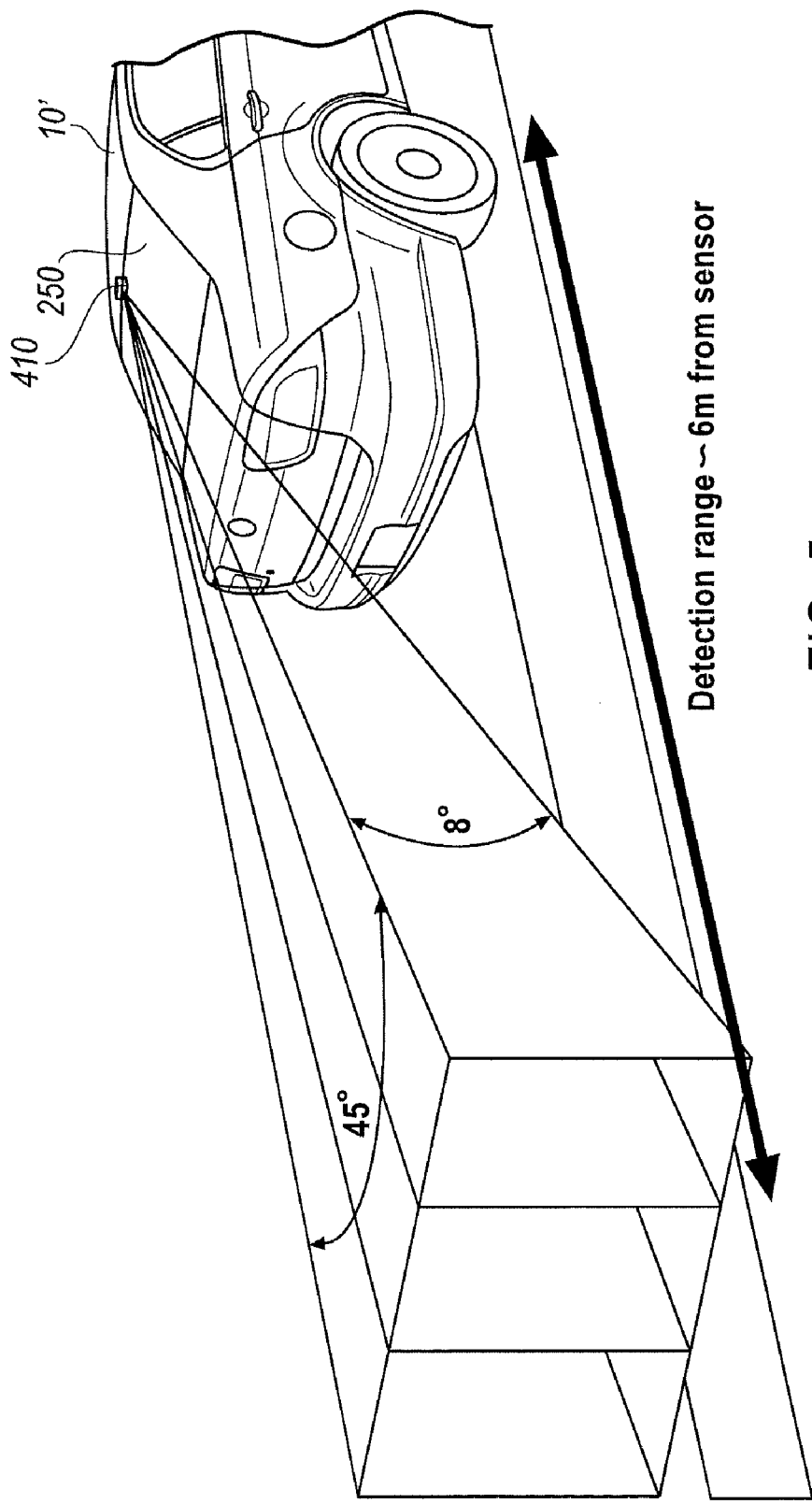
FIG. 5 is a schematic representation of the closing velocity sensor beams in one embodiment of the present application.

Implementation and operation of the closing velocity sensor 100 will now be described in greater detail. The closing velocity (CV) sensor 100 is designed to be optionally mounted at a relatively high position onto or close to the rear view windscreen 250 of the host vehicle 10. Such a mounting position potentially provides an optimal field of view of a region rearward of the vehicle 10, namely in a region wherein one or more potential impact hazards are likely to be encountered. The sensor 100 employs the three beams 400a, 400b, 400c to provide a sensing field having an approximate lateral angular extent $\theta_1$ of about 45° as depicted in FIG. 4. The sensing field is partitioned into three sectors, each sector being served by its corresponding beam 400a, 400b, 400c, such that the beams 400a, 400b, 400c each provide a lateral sensing coverage having an angel $\theta_2$ of substantially about 15° as depicted in FIG. 4 and FIG. 5. Moreover, each beam 400a, 400b, 400c also provides a vertical field of sensing of substantially about 8° with an inclination of substantially 4° in respect of a horizontal plane. Each sensing sector is provided with a set of three corresponding lenses in the sensor 100. Moreover, light sensitive diodes are employed, each in combination with its three lenses, to sense reflection of the beams 400a, 400b, 400c reflected back to the sensor 100. The diodes and their respective lenses are beneficially optically shielded from their corresponding lasers employed for generating the beams 400a, 400b, 400c to reduce direct coupling of optical radiation from the lasers to their respective light sensitive diodes. The lasers employed within the sensor 100 optionally exhibit an output radiation wavelength of substantially 905 nanometers and are class I laser category with regard to their radiation power output.

In operation, the closing velocity (CV) sensor 100 provides distance and velocity information regarding one or more rearwardly approaching objects in the rear of the vehicle 10 at an update rate of substantially 100 Hz, namely at 10 millisecond intervals. When measuring position and velocity, a sensing cycle is optionally implemented in the sensor 100 for each of the sectors. The cycle commences by each laser in the sensor 100 providing a burst of laser radiation for emission from the sensor 100. The burst has a duration of 2 milliseconds and comprises 100 pulses of radiation, wherein each pulse has a duration of substantially 30 nanoseconds. For each pulse emitted from the sensor 100, the aforesaid light sensitive diodes are scanned for substantially 100 nanoseconds to derive reflected radiation signals. Thereafter, a sum of all intensities in the reflected radiation signals are used for performing a distance calculation, the calculation optionally being implemented using a simple "centre of mass" approach, thereby simplifying computation required. From a determination of distance as a function of time, a closing velocity of an approaching bullet vehicle can therefrom be derived. Thus, in overview, the sensor 100 employs time-of-flight (TOF) measurements of IR-laser pulses to calculate relative distances between the vehicle 10 and one or more potentially hazardous objects in the rear of the vehicle 10; measured distance changes within a well-defined period of time are used to generate relative velocity data and hence aforesaid closing velocity data for the low cost whiplash reduction system.

However, it will be appreciated that the closing velocity (CV) sensor 100 can also be implemented using optical or radar Doppler techniques, wherein a portion of reflected radiation from one or more rearwardly approaching objects in a direction of travel of the vehicle 10 is mixed at the sensor 100 with a portion of radiation emitted from the sensor 100 towards the one or more rearwardly approaching objects to generate a Doppler beat signal from which a measure of closing velocity of the one or more objects to the vehicle 10 can be derived.

It will be appreciated that embodiments of the invention described in the foregoing are susceptible to being modified without departing from the scope of the invention.

Although application of the present invention in the context of a road vehicle is described in the foregoing, it will be appreciated that the present invention is also applicable to trucks, vans, motorcycles, motorbikes and scooters to mention some examples. The term "vehicle" in the accompanying claims is therefore to be construed to include at least such a range of vehicle types.

What is claimed as new and desired to be protected by Letters Patent of the United States is:

1. A low cost whiplash reduction system for a host vehicle, said host vehicle including a sensor arrangement operable to detect closing velocities of one or more rearwardly approaching objects substantially in a direction of travel of the host vehicle regardless of host vehicle speed, and a processing arrangement for receiving information from the sensor arrangement indicative of said detected closing velocities, said processing arrangement being operable to actuate adaptive safety features in response to detected velocities of detected rearwardly approaching objects to the host vehicle to automatically selectively apply said adaptive safety features in response to said information received from the sensor arrangement for avoiding or mitigating host vehicle occupant whiplash injury occasioned by a crash of the rearwardly approaching object and the host vehicle.

2. A low cost whiplash reduction system as claimed in claim 1, wherein the sensor arrangement includes a closing velocity sensor operable to employ one or more infrared laser sensors for sensing the one or more rearwardly approaching objects.

3. A low cost whiplash reduction system as claimed in claim 2, wherein said one or more infrared laser sensors are operable to employ pulse-echo signal analysis techniques to detect closing velocities of said one or more oncoming objects.

4. A low cost whiplash reduction system as claimed in claim 2, wherein said one or more infrared laser sensors are operable to employ optical Doppler frequency shift analysis to detect closing velocities of said one or more oncoming objects.

5. A low cost whiplash reduction system as claimed in claim 2, wherein said one or more infrared laser sensors are operable to employ pulse-echo signal analysis and optical Doppler frequency shift analysis to detect closing velocities of said one or more oncoming objects.

6. A low cost whiplash reduction system as claimed in claim 1, wherein said sensor arrangement is operable to sense said one or more oncoming objects at a distance in a range of 4 to 10 meters from the host vehicle.

7. A low cost whiplash reduction system as claimed in claim 1, wherein the sensor arrangement is adapted to be mounted behind a rearward rearview windscreen of the host vehicle through which a driver of the host vehicle may observes a region rear of the host vehicle, the sensor arrangement being operable to sense the one or more oncoming objects via the rearward rearview windscreen.

8. A low cost whiplash reduction system as claimed in claim 7, wherein said sensor arrangement is adapted to be mounted towards an upper region of the rearward rearview windscreen.

9. A low cost whiplash reduction system as claimed in claim 1, wherein said host vehicle includes a rear windscreen electronic module, and said sensor arrangement is included in said rear windscreen electronic module.

10. A low cost whiplash reduction system as claimed in claim 9, wherein the rear windscreen electronic module is integral as a unit with a rearward rearview windscreen of the host vehicle.

11. A low cost whiplash reduction system as claimed in claim 9, wherein the rear windscreen electronic module includes other sensors in addition to the closing velocity sensor arrangement.

12. A low cost whiplash reduction system as claimed in claim 1, wherein the sensor arrangement, the processing arrangement and the one or more adaptive safety features are coupled in mutual communication via one or more data communication networks of the host vehicle.

13. A low cost whiplash reduction system as claimed in claim 12, wherein the one or more data communication networks are implemented as one or more of: HS_CAN, MS_CAN, CAN, LIN.

14. A low cost whiplash reduction system as claimed in claim 1, wherein the sensor arrangement, the processing arrangement and the one or more adaptive safety features are mutually coupled by plurality of parallel communication network paths for improving pre crash preparedness.

15. A low cost whiplash reduction system as claimed in claim 1, wherein the system is operable to deploy operative measures including at least one of: adaptive seatbelt adjustment, active seat headrest deployment, adaptive structure deployment, air bag deployment, an audio warning, a visual warning, a haptic warning.

16. A low cost whiplash reduction system as claimed in claim 15, wherein the processing arrangement is operable to activate the audio warning and/or the visual warning prior to said one or more adaptive safety features.

17. A low cost whiplash reduction system as claimed in claim 15, wherein said adaptive seatbelt adjustment is operable to tension one or more seatbelts of the host vehicle.

18. A low cost whiplash reduction system as claimed in claim 15, wherein said adaptive seat headrest deployment is operable to move the seat headrest upwards and forwardly towards an occupant of the vehicle.

19. A method of automatically actuating adaptive safety features responsive to a rearwardly approaching object to a host vehicle regardless of host vehicle speed, said host vehicle including an automatic collision management system including a sensor arrangement coupled in communication with a processing arrangement and one or more adaptive safety features of the host vehicle; said method including steps of: (a) employing the sensor arrangement to detect closing velocities of one or more rearwardly approaching objects in a direction of travel of the host vehicle regardless of host vehicle speed; (b) receiving information at the processing arrangement from the sensor arrangement describing said closing velocities of said one or more oncoming objects, and assessing from said information whether or not a rear end crash between said one or more oncoming objects and the host vehicle is likely, and (c) automatically actuating said adaptive safety features when a risk of a crash is determined by the processing arrangement to be likely.

20. A method as claimed in claim 19, including a step of arranging for the sensor arrangement to generate a plurality of infrared beams of optical radiation for sensing said one or more oncoming objects.

21. A method as claimed in claim 20, including a further step of directing the infrared beams of optical radiation through a rearward windscreen of said host vehicle for sensing said one or more rearwardly approaching objects.

* * * * *